(12) United States Patent
Li et al.

(10) Patent No.: US 10,691,161 B2
(45) Date of Patent: Jun. 23, 2020

(54) JOYSTICK

(71) Applicant: PixArt Imaging Inc., Hsin-Chu (TW)

(72) Inventors: Jr-Yi Li, Hsin-Chu (TW); Chi-Yang Huang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 8 days.

(21) Appl. No.: 16/029,640

(22) Filed: Jul. 8, 2018

(65) Prior Publication Data
US 2020/0012311 A1  Jan. 9, 2020

(51) Int. Cl.
*G09G 5/00* (2006.01)
*G05G 9/047* (2006.01)
*H04N 5/225* (2006.01)
*G06F 3/038* (2013.01)
*G06F 3/0338* (2013.01)

(52) U.S. Cl.
CPC .......... *G05G 9/047* (2013.01); *G06F 3/0338* (2013.01); *G06F 3/0383* (2013.01); *H04N 5/22521* (2018.08)

(58) Field of Classification Search
None
See application file for complete search history.

(56) References Cited

U.S. PATENT DOCUMENTS

| | | | | |
|---|---|---|---|---|
| 5,854,482 A | * | 12/1998 | Bidiville | G06F 1/1613 250/221 |
| 2011/0122060 A1 | * | 5/2011 | Westerweck | G02B 27/0977 345/156 |
| 2012/0313850 A1 | * | 12/2012 | Ishida | G02B 27/01 345/156 |

* cited by examiner

*Primary Examiner* — Nan-Ying Yang
(74) *Attorney, Agent, or Firm* — Winston Hsu

(57) ABSTRACT

A joystick includes a body, a feature identifier and a processor. The body has a lateral portion and a bottom portion connected with each other. The bottom portion is adapted to be pressed, and the lateral portion whereon an identification element is disposed is adapted to support the bottom portion. The feature identifier is disposed under the body and adapted to acquire an identification result about the body. The processor is electrically connected with the feature identifier and adapted to analyze state of the identification element within the identification result for generating a control signal. The feature identifier is an image sensor, and accordingly the identification result is a frame captured by the image sensor.

21 Claims, 9 Drawing Sheets

JOYSTICK

BACKGROUND OF THE INVENTION

1. Field of the Invention

The present invention relates to a joystick, and more particularly, to a joystick capable of being operated in an over-twisting condition and applying to biometric identification.

2. Description of the Prior Art

A conventional mechanical joystick includes a sensor, a trackball, a lever arm and a handle. A user presses the handle to move the lever arm, the lever arm can be inclined and rotated via the trackball, and the sensor detects motion of the trackball to control a cursor signal output by the mechanical joystick. The handle is made by solid material and can be pushed and pulled to recline the lever arm for generating the cursor signal. While the mechanical joystick is reclined, the lever arm can be rotated or slanted towards specially designated directions, and the trackball recovers the lever arm via a spring. Therefore, the conventional mechanical joystick is operated by limited gestures due to the designated directions, and may easily result in mechanical fatigue by long-term usage.

SUMMARY OF THE INVENTION

The present invention provides a joystick capable of being operated in an over-twisting condition and applying to biometric identification for solving above drawbacks.

According to the claimed invention, a joystick includes a body, a feature identifier and a processor. The body has a lateral portion and a bottom portion connected with each other. The bottom portion is adapted to be pressed, and the lateral portion whereon an identification element is disposed is adapted to support the bottom portion. The feature identifier is disposed under the body and adapted to acquire an identification result about the body. The processor is electrically connected with the feature identifier and adapted to analyze state of the identification element within the identification result for generating a control signal. The feature identifier is an image sensor, and accordingly the identification result is a frame captured by the image sensor.

According to the claimed invention, the lateral portion includes a first side and a second side opposite to each other. The first side is connected to the bottom portion and the second side is connected to a substrate whereon the feature identifier is disposed. The identification element comprises at least one striped pattern oriented towards a direction parallel to a connection line between the first side and the second side. The identification element comprises at least one circular pattern oriented towards a direction intersected to a connection line between the first side and the second side. The identification element comprises a plurality of dot patterns arranged in asymmetry.

According to the claimed invention, a joystick includes a body, a transparent component, an image sensor and a processor. The body has a lateral portion and a bottom portion connected with each other. The bottom portion with a penetrating hole is adapted to be pressed by a user, and the lateral portion whereon an identification element is disposed is adapted to support the bottom portion. The transparent component is embedded in the penetrating hole. The image sensor is disposed under the body and adapted to capture a frame about the body. The processor is electrically connected with the image sensor, and the processor is adapted to analyze state of the identification element within the frame for generating a control signal, and further to analyze a pattern about the user touching the transparent component for acquiring a biometric feature of the user.

According to the claimed invention, a joystick includes a body, a transparent component, a feature identifier and a processor. The body has a lateral portion and a bottom portion connected with each other. A penetrating hole is formed on the bottom portion, and the lateral portion whereon an identification element is disposed is adapted to support the bottom portion. The transparent component is embedded in the penetrating hole. The feature identifier is disposed under the body, and includes an identifying array divided into a first region and a second region adapted to acquire identification results respectively about the bottom portion and the lateral portion. The processor is electrically connected with the feature identifier, and the processor is adapted to compare the identification result about the bottom portion with a threshold and then determine whether to actuate the second region in accordance with a comparison result.

The joystick of the present invention has the identification element disposed on the lateral portion of the body, and the identification element can be used to provide deformed information of the body when the identification dots formed on the bottom portion are moved out of the field of view of the feature identifier. Moreover, the body can have the penetrating hole embedded by the transparent component, and the feature identifier can be partly actuated to detect the transparent component, and then the other part of the feature identifier is actuated to detect at least one of the identification element and the identification dots when the detection result of the transparent component conforms to the predefined condition. Thus, the joystick of the present invention can be operated in an over-twisting condition and has advantages of biometric identification and energy economy.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
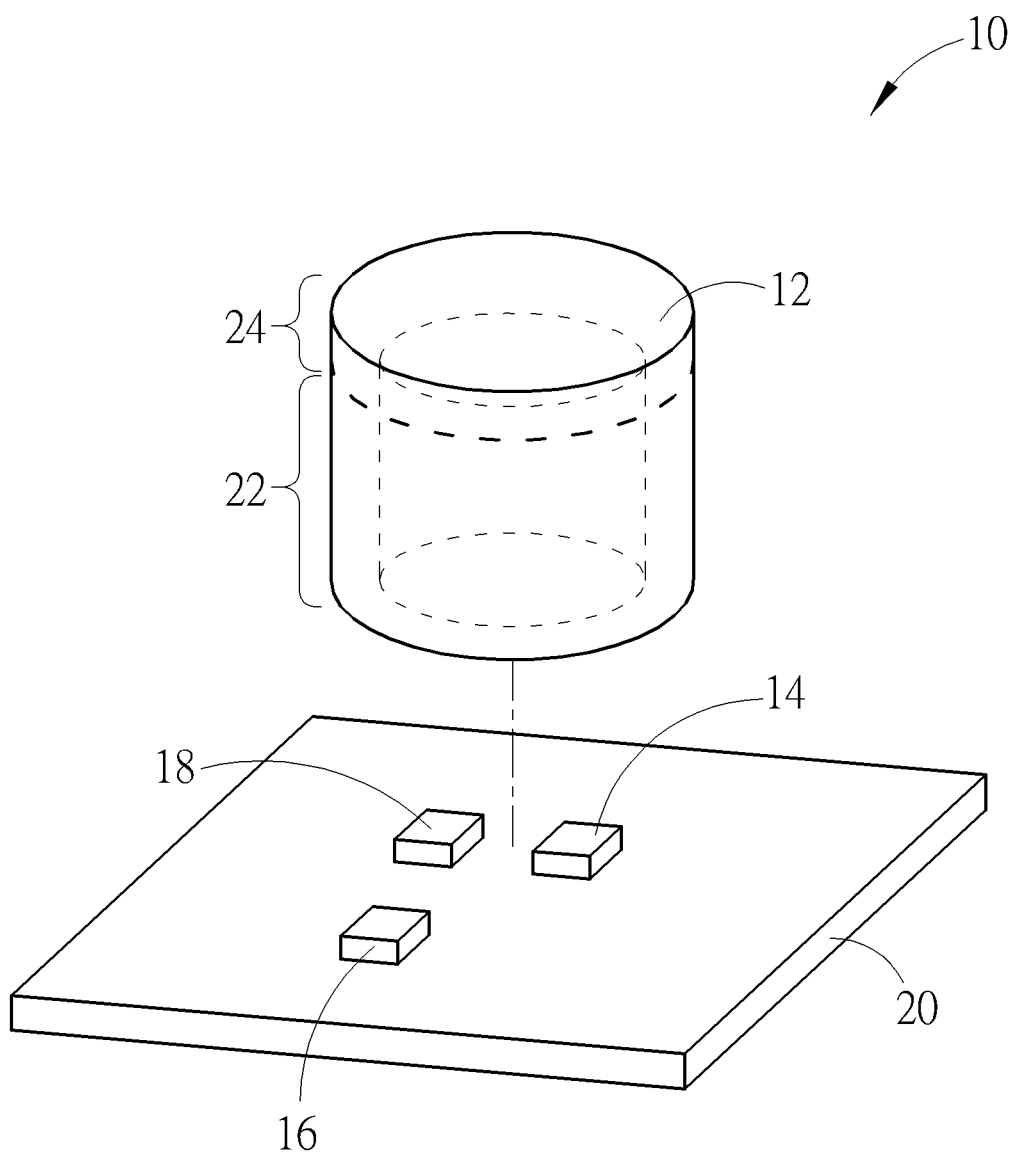
FIG. 1 is a diagram of a joystick according to a first embodiment of the present invention.
Figure 2:
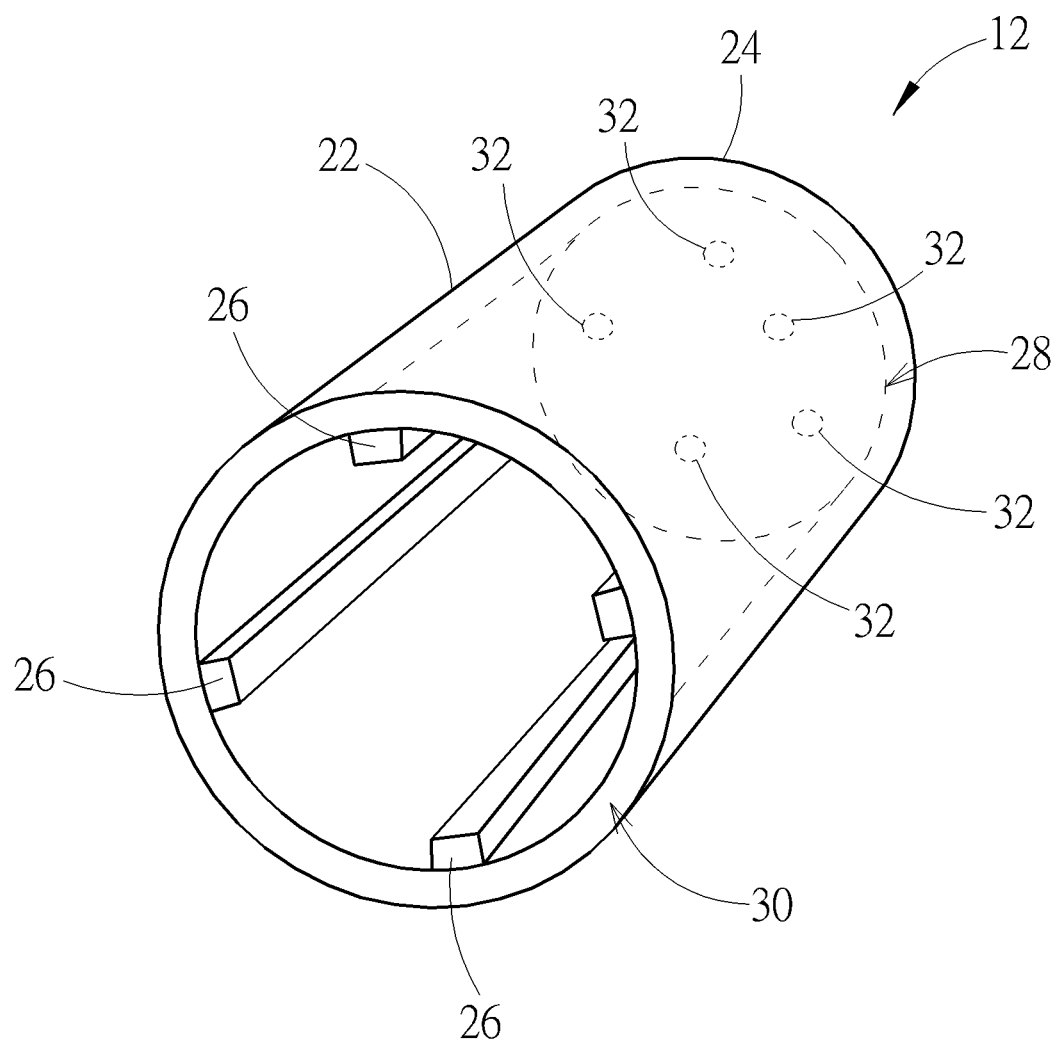
FIG. 2 and FIG. 3 are other views of a body of the joystick according to the first embodiment of the present invention.
Figure 3:
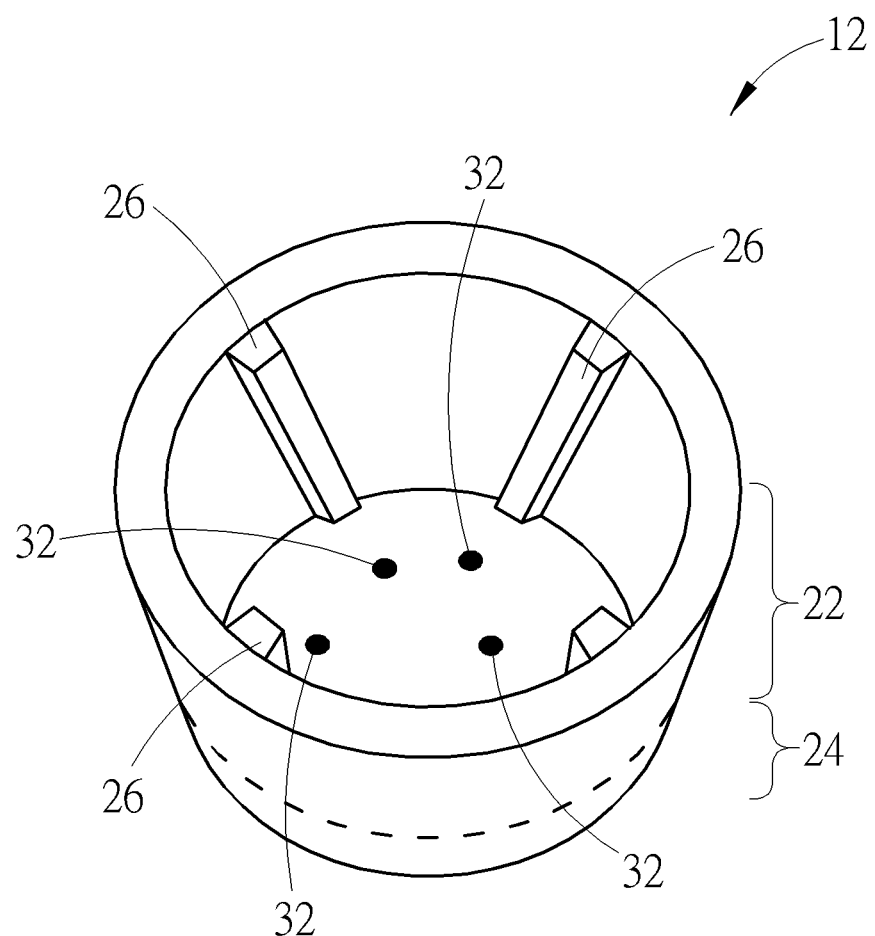

Please refer to FIG. 1 to FIG. 3. FIG. 1 is a diagram of a joystick 10 according to a first embodiment of the present invention. FIG. 2 and FIG. 3 are other views of a body 12 of the joystick 10 according to the first embodiment of the present invention. The joystick 10 can include the body 12, a feature identifier 14, a processor 16 and a light source 18. The feature identifier 14, the processor 16 and the light source 18 are disposed on a substrate 20. The processor 16 can be independent of the feature identifier 14, or can be the built-in element of the feature identifier 14. The body 12 is put on the substrate 20 and at least covers the feature identifier 14 and the light source 18. The body 12 can have a lateral portion 22 and a bottom portion 24 connected with each other. At least one identification element 26 is disposed on the lateral portion 22. The lateral portion 22 is used to support the bottom portion 24, and the bottom portion 24 can be pressed by a user. The body 12 is made by resilient material. The light source 18 can be an optional unit; for example, the joystick 10 is not in need of the light source when the lateral portion 22 is made of transparent material.

The feature identifier 14 can be disposed under the body 12 and used to acquire an identification result about the identification element 26 on the body 12. The light source 18 can be disposed inside the body 12 and used to project a beam onto the identification element 26. The processor 16 can be electrically connected with the feature identifier 14 and the light source 18, and used to analyze state of the identification element 26. The lateral portion 22 can include first side 28 and a second side 30 opposite to each other. The first side 28 is near the bottom portion 24 and the second side 30 is near the substrate 20 whereon the feature identifier 14 is disposed. In the first embodiment of the present invention, the identification element 26 can include several striped patterns oriented towards a direction substantially parallel to a connection line between the first side 28 and the second side 30. The identification element 26 can be straight or curved; the straight element can be the said striped pattern, and the curved element can be a spiral pattern which is not shown in the figures. The processor 16 can analyze the state of the identification element 26 to generate a control signal.

In addition, a plurality of identification dots 32 can be optionally formed on the bottom portion 24. The processor 16 further can analyze variation of the plurality of identification dots 32 acquired by the feature identifier 14. When the user presses the bottom portion 24, the bottom portion 24 can be deformed, and a shape and an arrangement of the identification dots 32 can be varied accordingly, thus the processor 16 can analyze the variation of the plurality of identification dots 32 to generate the control signal. The lateral portion 22 is deformed due to pressure from the bottom portion 24. If the plurality of identification dots 32 is moved out of a field of view of the feature identifier 14, the feature identifier 14 acquires the state of the identification element 26 and the processor 16 can analyze the state to generate the control signal.

Figure 4:
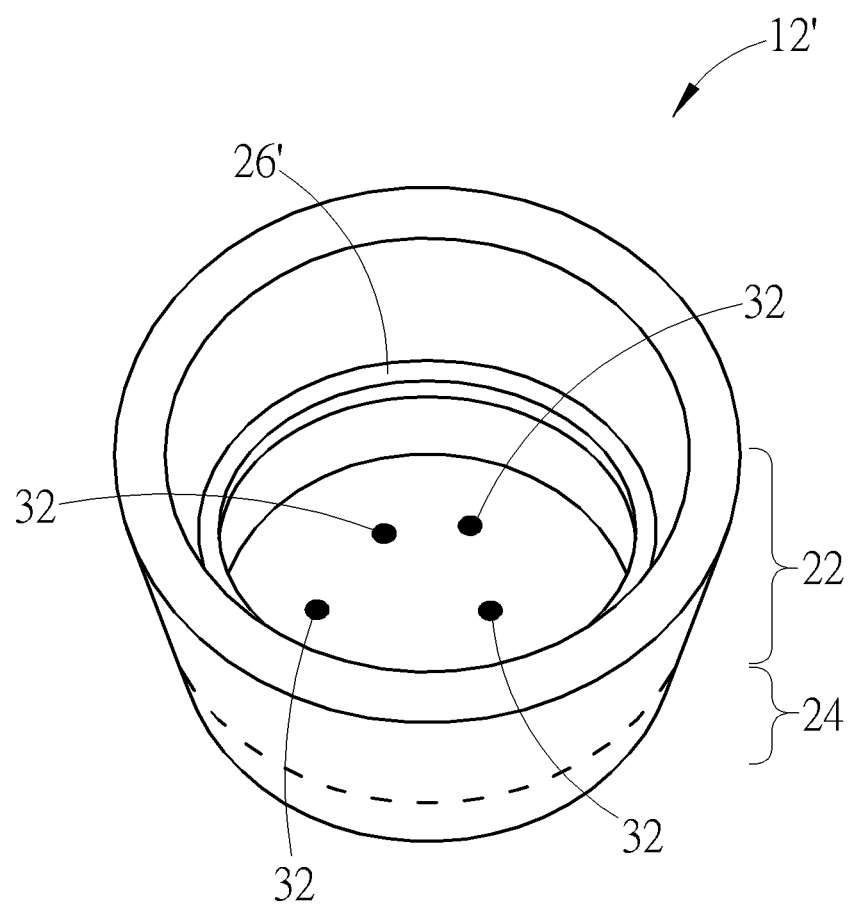
FIG. 4 is a diagram of the body according to a second embodiment of the present invention.
Figure 5:
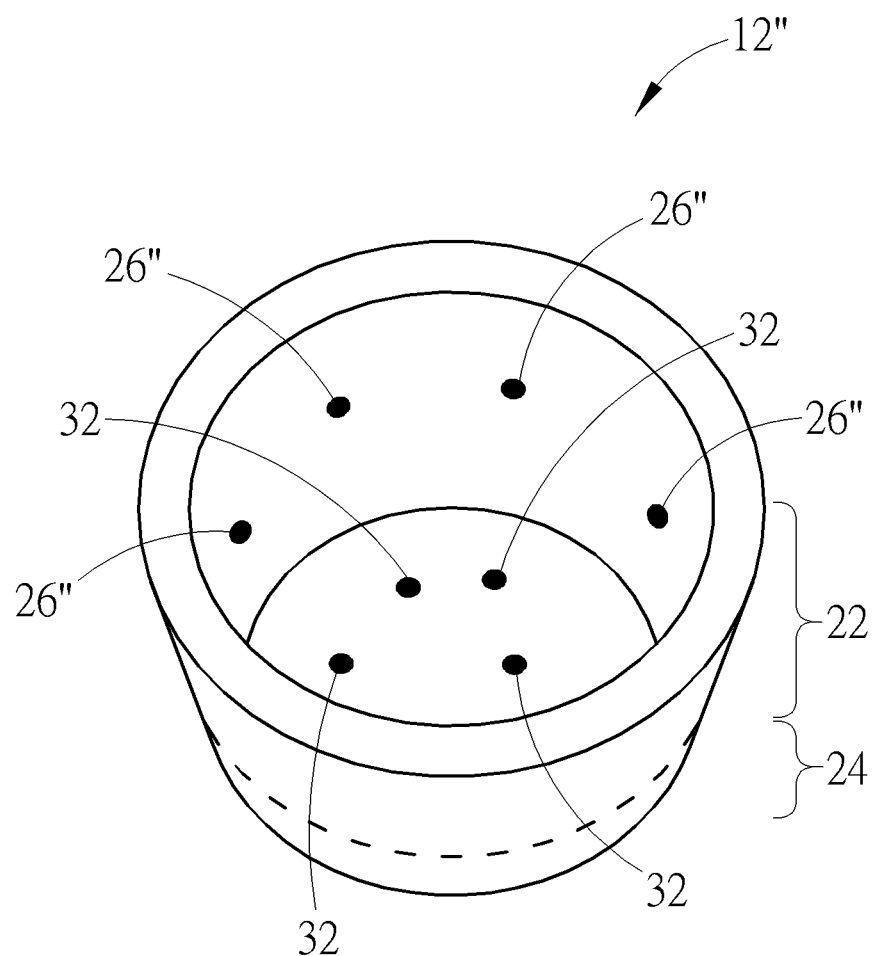
FIG. 5 is a diagram of the body according to a third embodiment of the present invention.

Please refer to FIG. 4 and FIG. 5. FIG. 4 is a diagram of the body 12' according to a second embodiment of the present invention. FIG. 5 is a diagram of the body 12" according to a third embodiment of the present invention. In the second embodiment, the identification element 26' can be at least one circular pattern oriented towards a direction intersected to the connection line between the first side 28 and the second side 30. The circular pattern 26' may be a round form when the body 12' is not pressed, and can be transformed into several kinds of elliptic forms when the body 12' is pressed and twisted; thus, the processor 16 can analyze the state of the circular pattern 26' for generating the control signal. Besides, in the third embodiment, the identification element 26" can be a plurality of dot patterns arranged on the lateral portion 22 in asymmetry. An arrangement and a shape of the dot patterns 26" can be acquired by the feature identifier 14 and analyzed by the processor 16 for generating the control signal.

It should be mentioned that styles, amounts and positions of the identification element 26, 26' and 26" are not limited to the above-mentioned embodiments, and depend on design demand. In the foresaid embodiments, the feature identifier 14 can be an image sensor, and the identification result can be a frame captured by the image sensor. When determined by single frame, the processor 16 can analyze a shape of the identification element to decide the control signal; for example, the straight striped pattern 26 or the round circular pattern 26' represents the joystick 10 is not pressed, and the arc striped pattern 26 or the elliptic circular pattern 26' represents the joystick 10 is pressed. When determined by a plurality of frames, the processor 16 can analyze variation between adjacent frames to decide the control signal. The feature identifier 14 further can be other sorts of sensors, such as an inductive sensor, an optical sensor, or a capacitive sensor.

Figure 6:
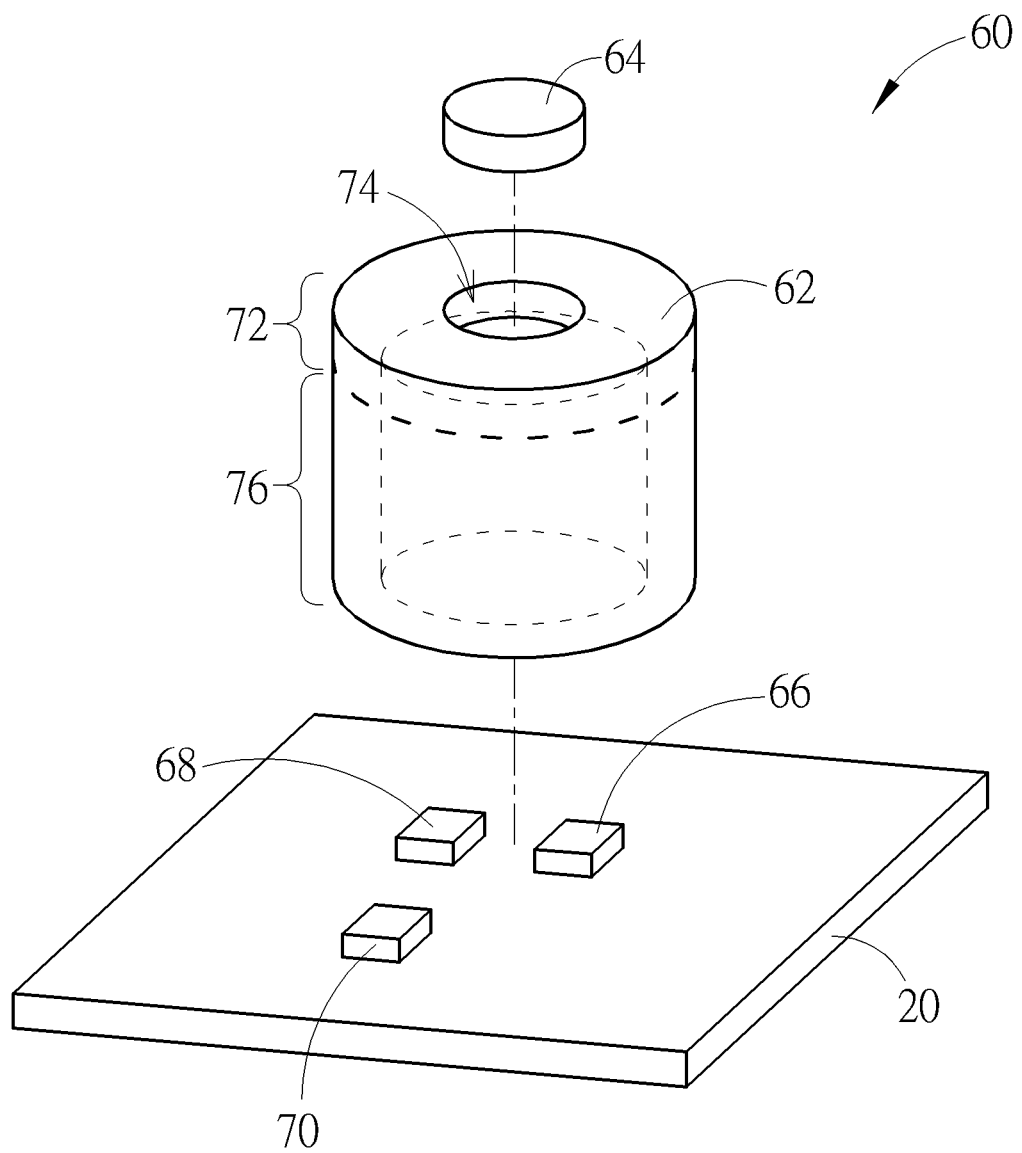
FIG. 6 is a diagram of a joystick according to a fourth embodiment of the present invention.
Figure 7:
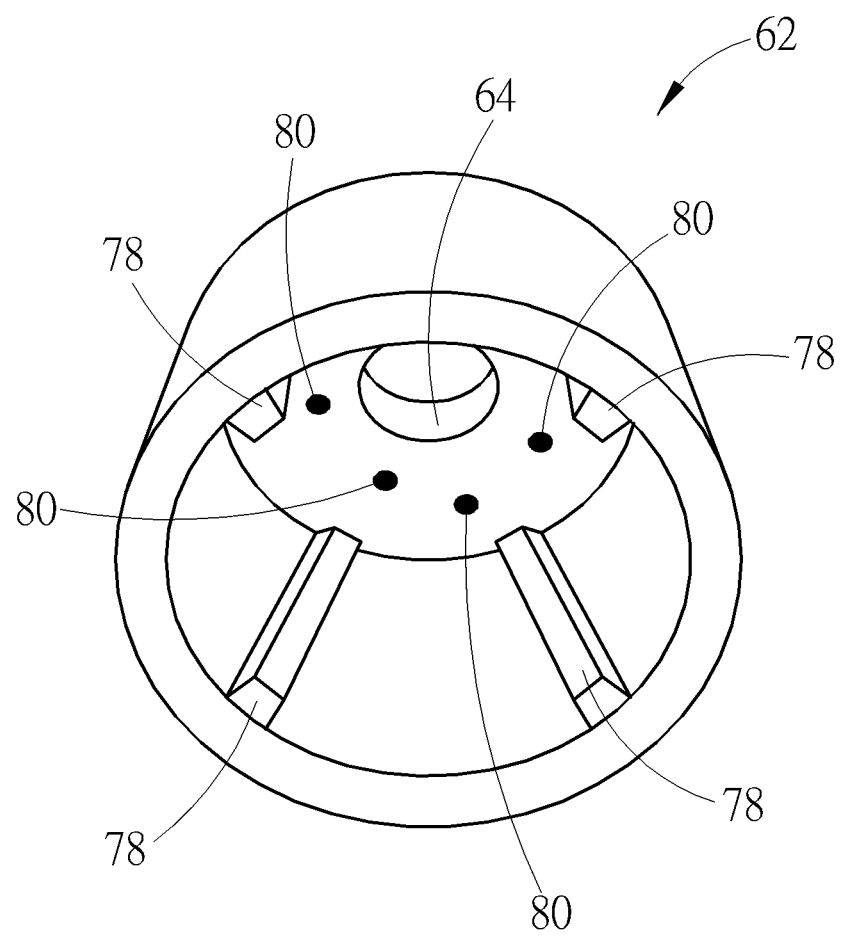
FIG. 7 is another view of a body of the joystick according to the fourth embodiment of the present invention.

Please refer to FIG. 6 and FIG. 7. FIG. 6 is a diagram of a joystick 60 according to a fourth embodiment of the present invention. FIG. 7 is another view of a body 62 of the joystick 60 according to the fourth embodiment of the present invention. The joystick 60 can include the body 62, a transparent component 64, an image sensor 66, a light source 68, and a processor 70. The body 62 has a bottom portion 72 whereon at least partial region of the bottom portion 72 is light transparent. In one embodiment, a penetrating hole 74 is formed, and a lateral portion 76 whereon an identification element 78 is disposed. The penetrating hole 74 can be omitted as long as the bottom portion 72 remains light transparent in the at least partial region. In the fourth embodiment, the identification element 78 can be the striped pattern, the circular pattern, or the plurality of dot patterns, which are similar to the foresaid embodiments and detailed descriptions are omitted herein for simplicity. A plurality of identification dots 80 can be optionally formed on the bottom portion 72. The transparent component 64 can be embedded in the penetrating hole 74. The light source 68 is used to project the beam onto the body 62, and the image sensor 66 is used to capture a frame about the body 62.

When the bottom portion 72 is pressed by the user, the processor 70 can analyze state of the identification element 78 or variation of the plurality of identification dots 80 to determine a gesture of the user; as deformation of the bottom portion 72 is overdone and the plurality of identification dots 80 is moved out of the field of view of the image sensor 66, the processor 70 can analyze the state of the identification element 78 within the frame to generate the control signal. Moreover, the user touches the bottom portion 72 for pressing the joystick 60, so that the image sensor 66 can capture a pattern about the user (such as the pattern of user's finger) via the transparent component 64, and the processor 70 can analyze the pattern to acquire a biometric feature of the user. The biometric feature may be the fingerprint, the heart rate or any biometric recognition.

Figure 8:
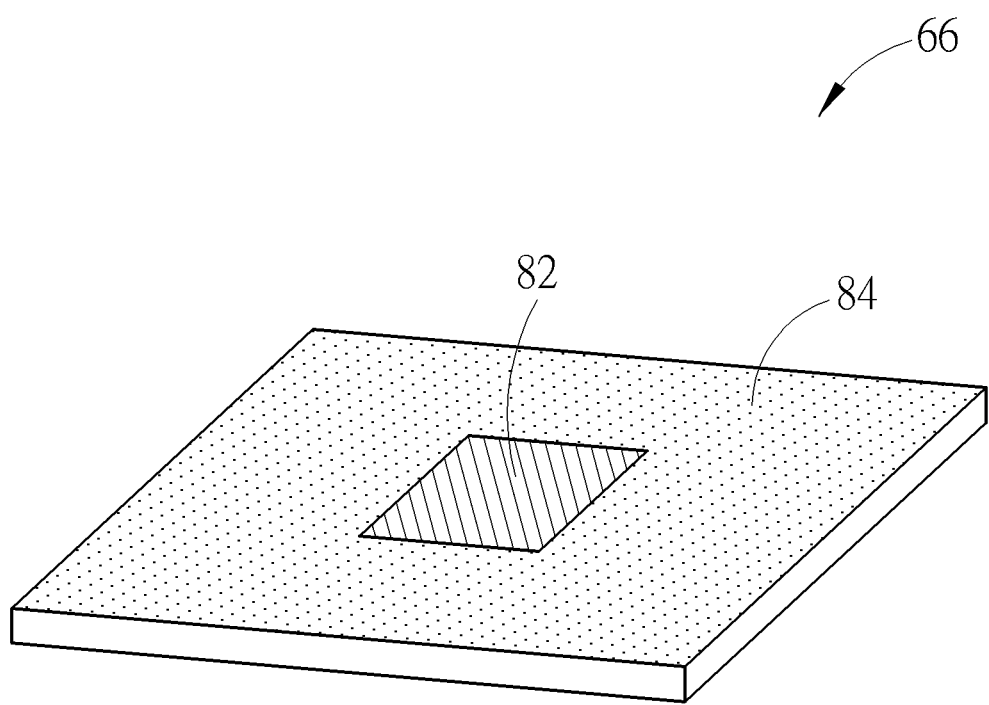
FIG. 8 is a diagram of an image sensor shown in FIGS. 6-7.

Please refer to FIG. 8. FIG. 8 is a diagram of the image sensor 66 shown in FIGS. 6-7. The image sensor 66 can have a sensor array divided into a first region 82 and a second region 84. The first region 82 is positioned on a center of the sensor array and used to capture a first frame about the bottom portion 72 having the penetrating hole 74 embedded by the transparent component 64. The second region 84 is positioned around the first region 82 and used to capture a second frame about the lateral portion 76. The first region 82 and the second region 84 of the sensor array can be actuated at different time for multifunctional application. The processor 70 can identify the biometric feature via the first frame acquired by the first region 82 for a start, and then determine whether to drive an application of the second region 84 in accordance with an identification result. For example, the first region 82 may be high quality sensors and the second region 84 may be low quality sensors. The processor 70 can identify the fingerprint via the first region 82. If the fingerprint belongs to the user A, the second region 84 is actuated and the second frame is used to determine the control signal in accordance with a habit of the user A; if the finger-print belongs to the user B, the second region 84 is actuated to determine the control signal by different habits.

In another possible embodiment, the image sensor 66 can be other sorts of feature identifiers, such as the inductive sensor or the capacitive sensor, and the feature identifier can include the first region 82 and the second region 84. The first region 82 is positioned on the center of an identifying array of the feature identifier, and the second region 84 is positioned around the first region 82, as shown in FIG. 8. The processor 70 can utilize the first region 82 to compare the state of the identification result about the bottom portion 72 with a threshold, and then determine whether to actuate the second region 84 in accordance with a comparison result. The processor 70 may have a threshold, and compute a sum or an average of a detecting result of the first region 82 for a comparison with the threshold. As the identification result about the bottom portion 72 acquired via the first region 82 is changed over the threshold, the joystick 60 is believed in being touched by the user so the second region 84 can be actuated in a wakeup mode accordingly. If the identification result is changed lower than the threshold or the state of the identification element is changed less than another threshold, the joystick 60 is believed in not being touched by the user, and the second region 84 can be kept in a sleep mode.

Figure 9:
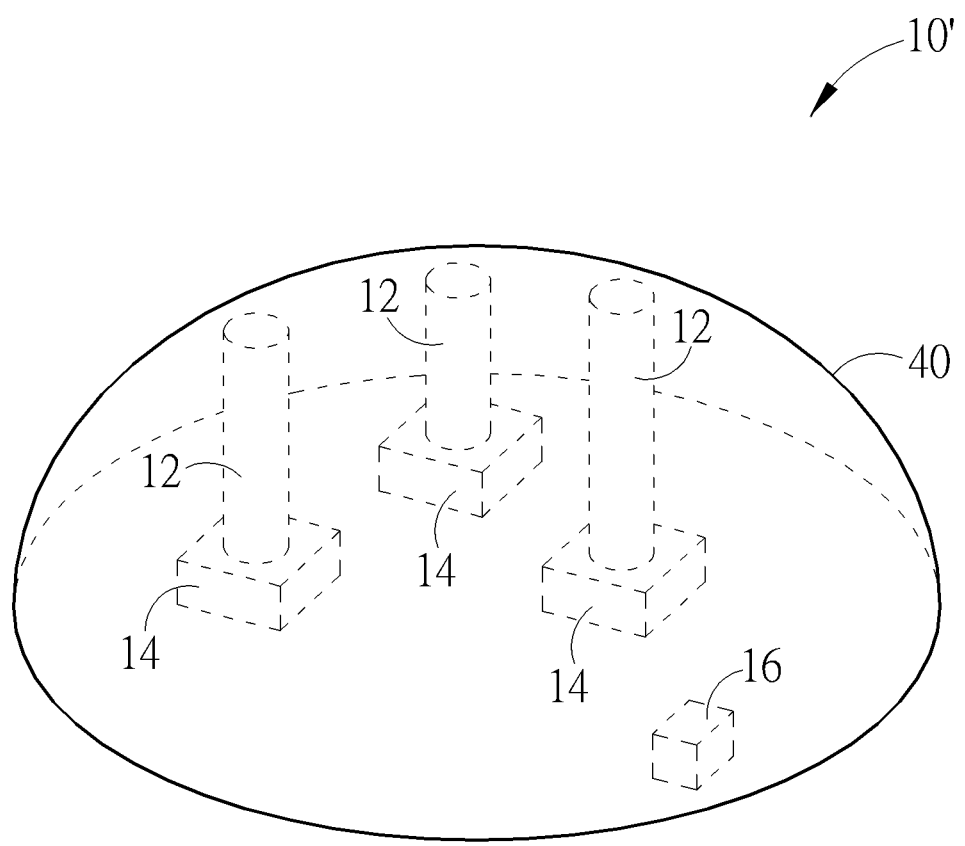
FIG. 9 is a diagram of the joystick according to a fifth embodiment of the present invention.

Please refer to FIG. 9. FIG. 9 is a diagram of the joystick 10' according to a fifth embodiment of the present invention. The joystick 10' can include a deformable structure 40 and a plurality of bodies 12 and a plurality of feature identifiers 14. The deformable structure 40 can be a semicircle sphere (or any other forms) made by resilient material. The resilient material may be silica gel or rubber. The plurality of bodies 12 and the plurality of feature identifiers 14 are disposed on different positions inside the deformable structure 40 and electrically connected with the processor 16. The user can push, grasp, pinch and press the deformable structure 40 via a palm and fingers. Each feature identifier 14 can acquire the identification result about the corresponding body 12, and the processor 16 can analyze identification results to generate the control signal in accordance with the user's gesture applied to the deformable structure 40.

In the present invention, the joystick has the identification element disposed on the lateral portion of the body, and the identification element can be used to provide deformed information of the body when the identification dots formed on the bottom portion are moved out of the field of view of the feature identifier. Moreover, the body can have the penetrating hole embedded by the transparent component, and the feature identifier can be partly actuated to detect the transparent component, and then the other part of the feature identifier is actuated to detect at least one of the identification element and the identification dots when the detection result of the transparent component conforms to the pre-defined condition. Thus, the joystick of the present invention can be operated in an over-twisting condition and has advantages of biometric identification and energy economy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A joystick, comprising:
    a body having a lateral portion and a bottom portion connected with each other, the bottom portion with a penetrating hole being adapted to be pressed by a user, the lateral portion whereon an identification element is disposed being adapted to support the bottom portion, the identification element being deformed in response to the body deformed by external pressure;
    a transparent component embedded in the penetrating hole;
    an image sensor disposed under the body and adapted to capture a frame about the body; and
    a processor electrically connected with the image sensor, and the processor being adapted to analyze a deformed state of the identification element within the frame for determining deformation of the body and generating a control signal, and further to analyze a pattern about the user touching the transparent component for acquiring a biometric feature of the user.

2. The joystick of claim 1, wherein the identification element comprises at least one striped pattern, at least one circular pattern, or a plurality of dot patterns.

3. The joystick of claim 2, wherein the lateral portion comprises a first side and a second side opposite to each other, the first side is connected to the bottom portion and the second side is connected to a substrate whereon the image sensor is disposed, the at least one striped pattern is oriented towards a direction parallel to a connection line between the first side and the second side, the at least one circular pattern is oriented towards a direction intersected to the connection line, and the plurality of dot patterns arranged in asymmetry.

4. The joystick of claim 1, wherein the image sensor comprises a sensor array divided into a first region and a second region, the first region is used to capture a first frame about the bottom portion, and the second region is used to capture a second frame about the lateral portion.

5. The joystick of claim 4, wherein the processor is adapted to identify the biometric feature via the first frame captured by the first region, and further to determine whether to drive an application of the second region in accordance with an identification result.

6. The joystick of claim 4, wherein the processor is adapted to compute a sum or an average of a detecting result of the first region for determination.

7. The joystick of claim 1, further comprising:
    a light source disposed inside the body and adapted to project a beam onto the body.

8. A joystick, comprising:
    a body having a lateral portion and a bottom portion connected with each other, a penetrating hole being formed on the bottom portion, the lateral portion whereon an identification element is disposed being adapted to support the bottom portion, the identification element being deformed in response to the body deformed by external pressure;
    a transparent component embedded in the penetrating hole;
    a feature identifier disposed under the body and comprising an identifying array divided into a first region and a second region adapted to acquire identification results respectively about the bottom portion and the lateral portion; and a processor electrically connected with the feature identifier, and the processor being adapted to compare the identification result about the bottom portion with a threshold, and then determine whether to actuate the second region for analyzing a deformed state of the identification element so as to determine deformation of the body and generate a control signal in accordance with a comparison result.

9. The joystick of claim 8, wherein the identification element comprises at least one striped pattern, at least one circular pattern, or a plurality of dot patterns.

10. The joystick of claim 9, wherein the lateral portion comprises a first side and a second side opposite to each other, the first side is connected to the bottom portion and the second side is connected to a substrate whereon the feature identifier is disposed, the at least one striped pattern is oriented towards a direction parallel to a connection line between the first side and the second side, the at least one circular pattern is oriented towards a direction intersected to the connection line, and the plurality of dot patterns arranged in asymmetry.

11. The joystick of claim 8, wherein the processor is adapted to compute a sum or an average of a detecting result of the first region for determining actuation of the second region.

12. The joystick of claim 8, wherein the processor is adapted to actuate the second region when the identification result about the bottom portion is changed over the threshold.

13. The joystick of claim 12, wherein the processor is adapted to switch the second region into a sleep mode when the identification result about the bottom portion is changed lower than the threshold.

14. The joystick of claim 12, wherein the processor is adapted to switch the second region into a sleep mode when state of the identification element is changed less than another threshold.

15. The joystick of claim 8, wherein the first region is positioned on a center of the identifying array, and the second region is positioned around the first region.

16. The joystick of claim 8, further comprising:
a light source disposed inside the body and adapted to project a beam onto the body.

17. The joystick of claim 8, wherein the feature identifier is an image sensor, and the identification result is a frame captured by the image sensor.

18. The joystick of claim 4, wherein the processor is adapted to actuate the second region when the identification result about the bottom portion is changed over the threshold.

19. The joystick of claim 4, wherein the processor is adapted to switch the second region into a sleep mode when the identification result about the bottom portion is changed lower than the threshold.

20. The joystick of claim 4, wherein the processor is adapted to switch the second region into a sleep mode when state of the identification element is changed less than another threshold.

21. The joystick of claim 4, wherein the first region is positioned on a center of the identifying array, and the second region is positioned around the first region.

* * * * *